United States Patent
Fruehling et al.

(10) Patent No.: US 11,105,681 B2
(45) Date of Patent: Aug. 31, 2021

(54) SPECTROSCOPY CAVITY WITH DIGITAL ACTIVATION OF MILLIMETER WAVE MOLECULAR HEADSPACE

(71) Applicant: Texas Instruments Incorporated, Dallas, TX (US)

(72) Inventors: Adam Joseph Fruehling, Garland, TX (US); Benjamin Stassen Cook, Addison, TX (US); Simon Joshua Jacobs, Lucas, TX (US); Juan Alejandro Herbsommer, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 283 days.

(21) Appl. No.: 16/203,536

(22) Filed: Nov. 28, 2018

(65) Prior Publication Data

US 2020/0166404 A1 May 28, 2020

(51) Int. Cl.
| | |
|---|---|
| *G01J 3/02* | (2006.01) |
| *G04F 5/14* | (2006.01) |
| *G01J 3/42* | (2006.01) |
| *H04B 1/38* | (2015.01) |
| *G01N 22/00* | (2006.01) |

(52) U.S. Cl.
CPC .......... *G01J 3/0289* (2013.01); *G01J 3/0205* (2013.01); *G01J 3/42* (2013.01); *G01N 22/00* (2013.01); *G04F 5/14* (2013.01); *H04B 1/38* (2013.01)

(58) Field of Classification Search
CPC ..... G21K 5/08; F17C 3/00; F17C 3/13; F17C 13/00; G01N 22/00; H04B 1/38; G01J 3/0289; G01J 3/0205; G01J 3/42; G04F 5/14

USPC .......... 331/3, 94.1; 250/251, 432 R
See application file for complete search history.

(56) References Cited

U.S. PATENT DOCUMENTS

| | | | |
|---|---|---|---|
| 9,529,334 B2 * | 12/2016 | Herbsommer | H03L 7/26 |
| 2006/0022761 A1 * | 2/2006 | Abeles | G04F 5/14 331/94.1 |
| 2015/0027908 A1 * | 1/2015 | Parsa | F17C 13/00 206/7 |
| 2016/0105149 A1 * | 4/2016 | Ishihara | G04F 5/14 331/94.1 |

(Continued)

OTHER PUBLICATIONS

"Hermetically Sealed Molecular Spectroscopy Cell with Buried Ground Plane", U.S. Appl. No. 15/697,505, filed Sep. 7, 2017, pp. 1-28.

(Continued)

*Primary Examiner* — Arnold M Kinkead
(74) *Attorney, Agent, or Firm* — Michael A. Davis, Jr.; Charles A. Brill; Frank D. Cimino

(57) ABSTRACT

Millimeter wave energy is provided to a spectroscopy cavity of a spectroscopy device that contains interrogation molecules. The microwave energy is received after it traverses the spectroscopy cavity. The amount of interrogation molecules in the spectroscopy cavity is adjusted by activating a precursor material in one or more sub-cavities coupled to the spectroscopy cavity by a diffusion path to increase the amount of interrogation molecules or by activating the getter material in one or more sub-cavities coupled to the spectroscopy cavity by a diffusion path to decrease the amount of interrogation molecules.

18 Claims, 14 Drawing Sheets

(56) References Cited

U.S. PATENT DOCUMENTS

2019/0152773 A1* 5/2019 Herbsommer ............ G04F 5/00

OTHER PUBLICATIONS

"Launch Structures for a Hermetically Sealed Cavity", U.S. Appl. No. 15/681,541, filed Aug. 21, 2017, pp. 1-27.
"Hermetically Sealed Molecular Spectroscopy Cell", U.S. Appl. No. 15/697,525, filed Sep. 1, 2017, pp. 1-21.
"Methods for Depositing a Measured Amount of a Species in a Sealed Cavity", U.S. Appl. No. 15/698,706, pp. 1-20.
"Hermetically Sealed Molecular Spectroscopy Cell with Dual Wafer Bonding", U.S. Appl. No. 15/698,346, pp. 1-21.

* cited by examiner

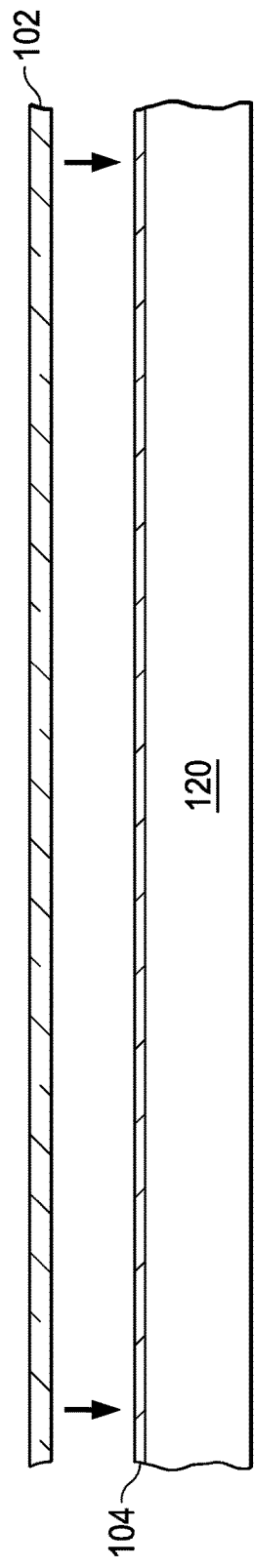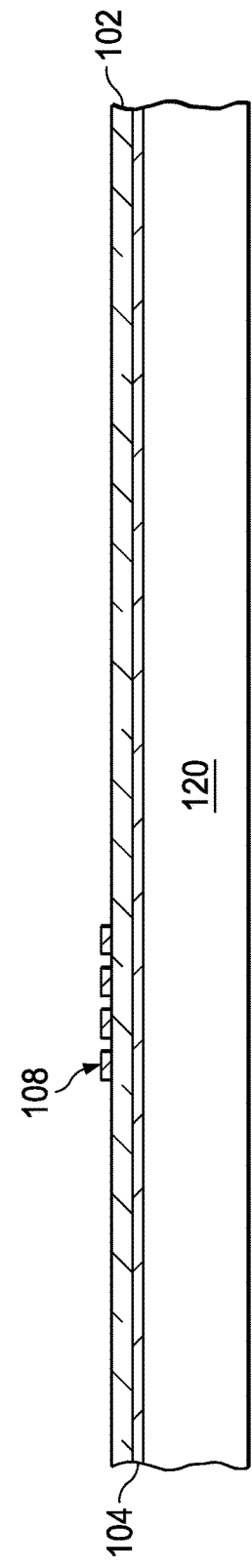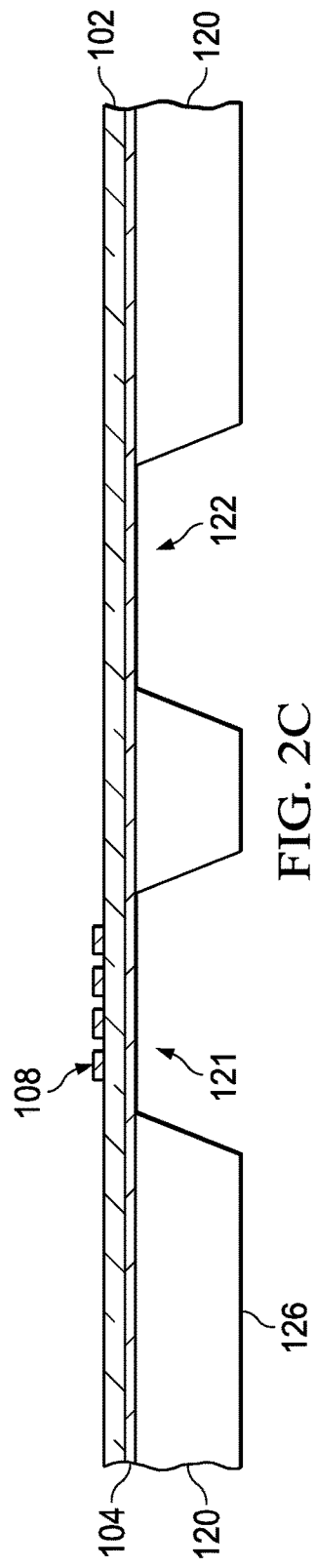

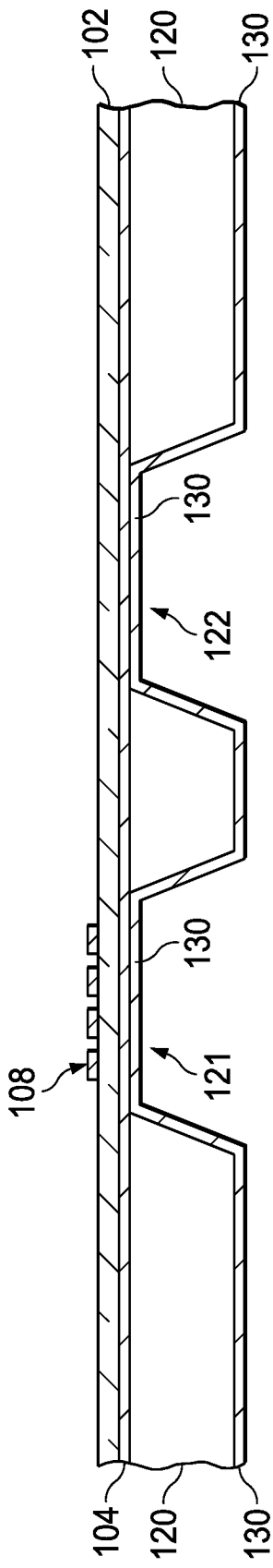
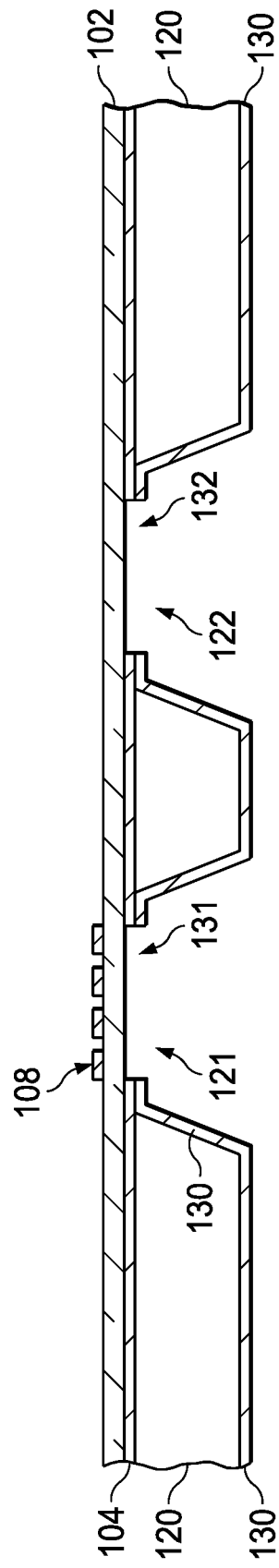

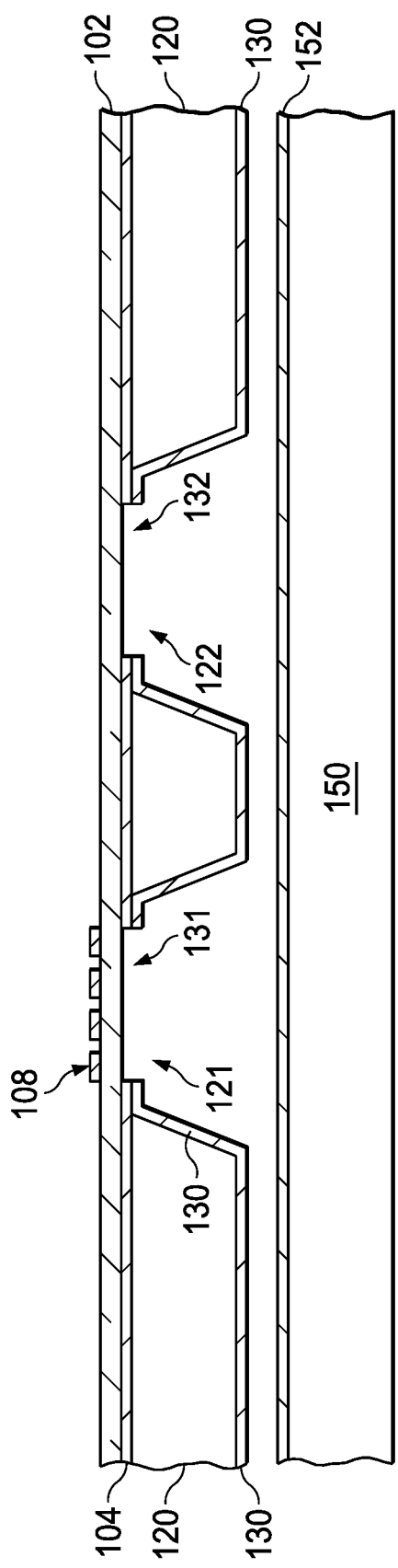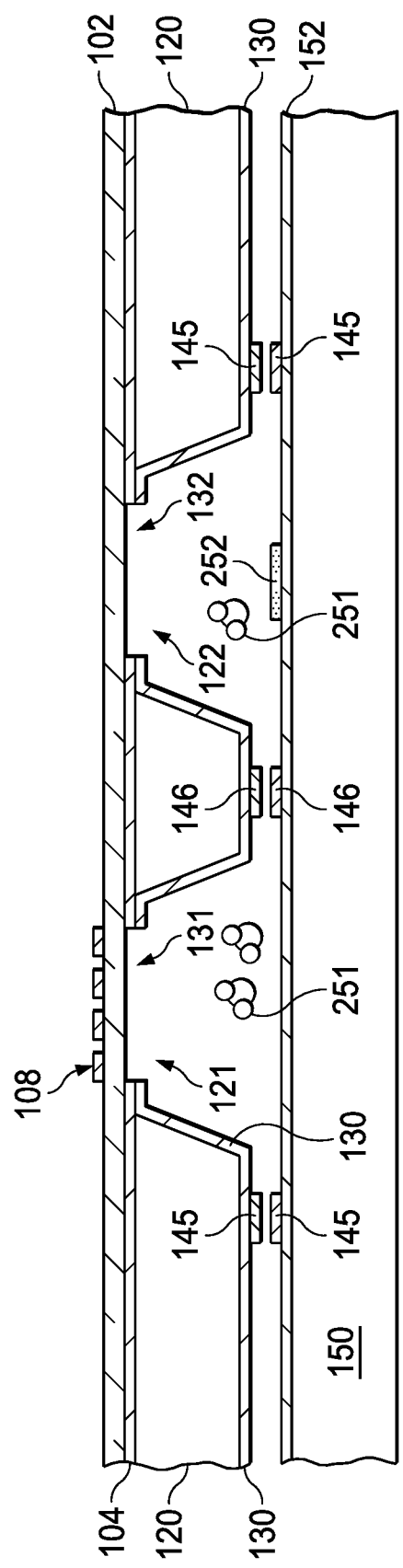

SPECTROSCOPY CAVITY WITH DIGITAL ACTIVATION OF MILLIMETER WAVE MOLECULAR HEADSPACE

TECHNICAL FIELD

This relates to digital control and tuning of the molecular headspace within a spectroscopy cavity.

BACKGROUND

Spectroscopy is the study of the interaction between matter and electromagnetic radiation. Spectroscopy originated through the study of visible light dispersal according to its wavelength by a prism. Spectroscopy includes the study of any interaction with radiative energy as a function of its wavelength or frequency. Spectroscopic data are often represented by an emission spectrum, which is a plot of the response of interest as a function of wavelength or frequency. Spectra of atoms and molecules often are represented by a series of spectral lines, each one representing a resonance between two different quantum states.

An atomic clock is a clock device that uses a quantum transition frequency in the microwave, optical, or ultraviolet region of the electromagnetic spectrum of atoms as a frequency standard for its timekeeping element. Atomic clocks are the most accurate time and frequency standards known and are used as primary standards for international time distribution services, to control the wave frequency of television broadcasts, and in global navigation satellite systems such as GPS.

The band of radio frequencies in the electromagnetic spectrum from 30 to 300 gigahertz (GHz) is designated as "extremely high frequency" (EHF) by the International Telecommunication Union (ITU). It lies between the super high frequency band (3-30 GHz) and the far infrared band (0.1-10 THz). Radio waves in this band have wavelengths from ten to one millimeter, giving it the name millimeter band or millimeter wave, sometimes abbreviated "MMW" or "mmW."

SUMMARY

Millimeter wave energy is provided to a spectroscopy cavity of a spectroscopy device that contains interrogation molecules. The microwave energy is received after it traverses the spectroscopy cavity. The amount of interrogation molecules in the spectroscopy cavity is adjusted by activating a precursor material in one or more sub-cavities coupled to the spectroscopy cavity by a diffusion path to increase the amount of interrogation molecules or by activating the getter material in one or more sub-cavities coupled to the spectroscopy cavity by a diffusion path to decrease the amount of interrogation molecules.

BRIEF DESCRIPTION OF THE DRAWINGS

FIGS. 2A-2H illustrates fabrication of the example spectroscopy cavity and sub-cavity.

DETAILED DESCRIPTION

Figure 1:
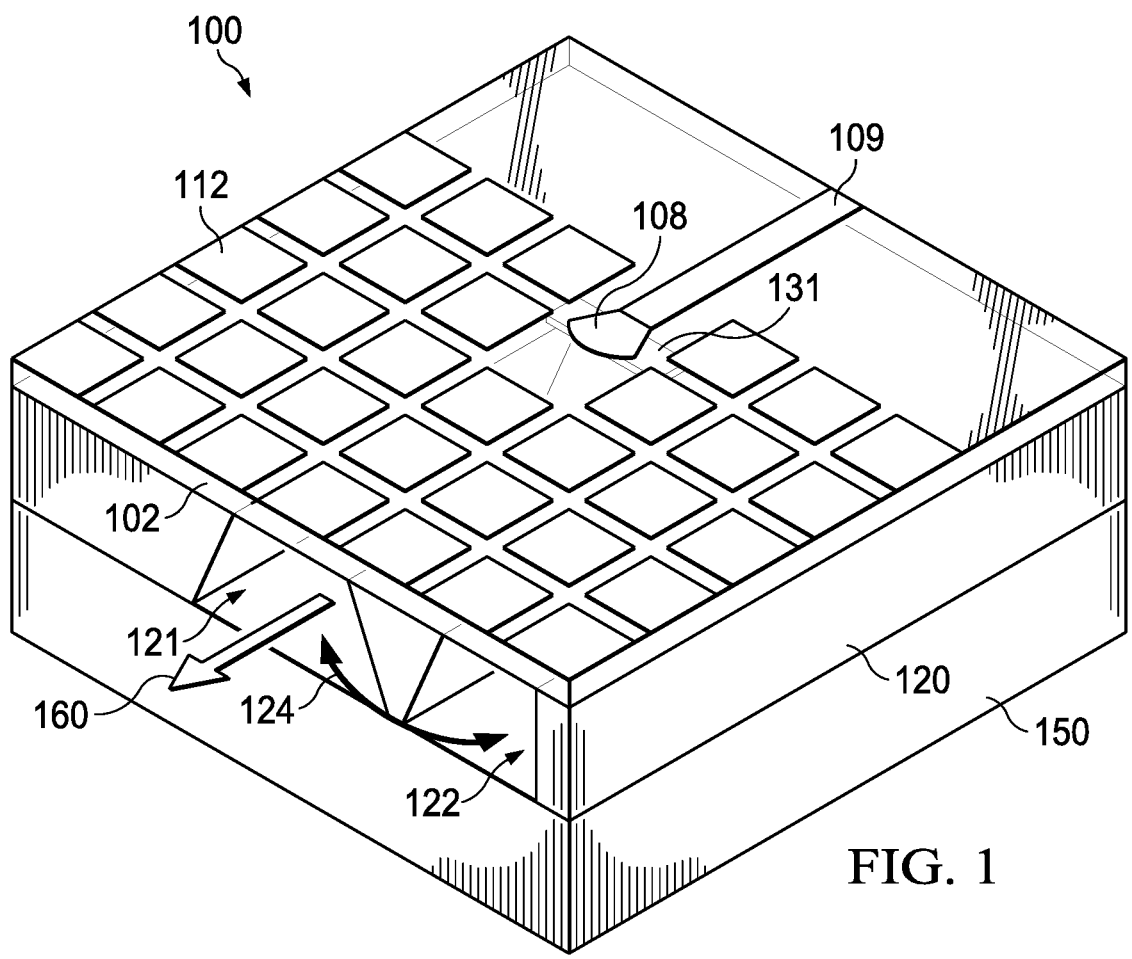
FIG. 1 is an isometric cross-sectional view of an example hermetically sealed cavity and sub-cavity that may be used as a spectroscopy cavity.

In the drawings, like elements are denoted by like reference numerals for consistency.

Various applications may include a sealed spectroscopy chamber formed in a semiconductor structure. Although there are numerous applications of a sealed chamber, in one example a chip-scale atomic clock may include a selected vapor at a low pressure in a sealed spectroscopy chamber.

For an integrated mmW (millimeter wave) atomic clock, extreme control of the gaseous environment is critical for clock stability and accuracy. During fabrication of an integrated circuit mmW spectroscopy, an interrogation gas is enclosed in a chamber by bonding together two substrates that contain a microfabricated cavity using a bonding chamber. However, production scale bonding chambers seldom have the environmental control precision to achieve the requisite pressure levels and gas concentrations in the microfabricated cavity. Furthermore, several of the species of interrogation gas that are most desirable for atomic clock vapor cells are toxic or hazardous and require special handling that would not be compatible with a production bonding chamber used for multiple processes.

An example fabrication process to address the formation of such chemicals within a hermetically sealed headspace is described in U.S. patent application Ser. No. 15/698,706 entitled "Methods for Depositing a Measured Amount of a Species in a Sealed Cavity", filed Sep. 8, 2017 and is incorporated by reference herein. Even if an appropriate bonding pressure, gas density, and precursor deposition is achieved in a dedicated chamber, the lot-to-lot variability may exceed the precision requirements for an atomic frequency reference. Furthermore, across the lifetime and operating conditions of a device, drift may occur and therefore post fabrication trimming of the gas density and/or pressure is useful.

As will be described in more detail hereinbelow, by providing co-fabricated sub-cavities with shared headspace to the mmW spectroscopy cavity that each contain pre-deposited precursor and/or active gettering material, the spectroscopy cavity headspace can be precisely tuned post-fabrication. By appropriate placement and construction, such sub-cavities can be fabricated without interfering with the RF performance of the spectroscopy cell. Post-fabrication trim can be achieved by several wafer scale activation methods including: laser heating, inductive/resistive heating, fuse blow on test, etc. The specific method for trim will depend upon whether system level requirements require open or closed loop pressure control.

As will be described in more detail herein below, an onboard locking method may be coupled to the sub-cavities and used to actively control active pressure and molecular release in order to extend part lifetime and improve clocking stability.

Post-assembly trim, active monitoring, and control of pressure alongside selective release of the interrogated molecule dramatically improves device performance and manufacturing tolerance.

FIG. 1 is an isometric cross-sectional view of an example device 100 that includes a hermetically sealed cavity 121 that may be used as a spectroscopy cavity and sub-cavity 122. In this example, a single sub-cavity 122 is illustrated, however, as described in more detail hereinbelow, multiple sub-cavities may be included within a single device. Each sub-cavity 122 is coupled to cavity 121 by a diffusion path 124 to form a shared headspace that allows interrogation molecules to be sourced or gettered by the sub-cavity 122 to thereby trim the gas pressure and density within the headspace of cavity 121.

In this example, cavity 121 and sub-cavity 122 are microfabricated in a first substrate 120, such as a semiconductor wafer. A second substrate 150, such as a semiconductor wafer, is then bonded to substrate 120 to thereby enclose cavity 121 and sub-cavity 122 to encapsulate an interrogation gas within cavity 121. In this example, an insulating layer 102, such as glass, is bonded to the exposed surface of substrate 120. In some examples, an electronic bandgap pattern 112 is patterned from a conductive layer above insulating layer 102.

A launch structure 108 is patterned from a second conductive layer and is coupled to transmitter circuity (not shown) by radio frequency (RF) path 109. Launch structure 108 is also referred to as an "antenna" herein. A matching receiver structure (not shown) is also patterned from the second conductive layer and coupled to a receiver circuit. The receiver structure is also referred to herein as an antenna. An RF signal 160 can be launched from launch structure 108 and travel through cavity 121 and the interrogation gas contained therein and be received by the receiver structure. An iris 131 (not specifically shown in FIG. 1) permits electromagnetic energy 160 to pass through the non-conductive structure 102 from the antenna 108 to the cavity 121.

The hermetically sealed cavity 121 contains selected dipolar molecules of an interrogation gas at a pressure chosen to optimize the amplitude of a signal absorption peak of RF signal 160 detected at the receiver structure of the cavity. In this example, cavity 121 contains a plurality of dipolar molecules (e.g., water molecules) at a relatively low pressure. For some examples, the pressure may be approximately 0.1 mbarr for water molecules. Nonlimiting examples of suitable electrical dipolar material gases include water, carbonyl sulfide (OCS), acetonitrile (CH3CN) and hydrogen cyanide (HCN). In another example, argon molecules may be used at a pressure of several atmospheres. Other examples may use other types of known or later developed interrogation molecules and pressures. Through closed-loop control, the frequency of RF signal 160 is dynamically adjusted to match the frequency corresponding to the absorption peak of the molecules in cavity 121.

The dimensions of the waveguide, antenna, EBG, and size and positioning of the iris are all design considerations based on frequency of the quantum transition selected from the molecular species inside the cavity. The required bandwidth of the structure depends upon the fabrication tolerances achievable in manufacturing.

FIGS. 2A-2I illustrate a sequence of process steps to fabricate the hermetically sealed cavity 121 and sub-cavity 122 of example device 100 (FIG. 1). In this example, a single sub-cavity 122 is illustrated. However, other examples may include additional sub-cavities that are fabricated in the same manner as described hereinbelow.

At FIG. 2A, a layer 101 of conductive material is deposited on a surface of substrate 120. A non-conductive structure 102 is then bonded to conductive layer 104 on substrate 120 to form a non-conductive aperture for the substrate 120. In this example, the non-conductive structure 102 is glass, but the nonconductive structure 102 can be other than glass in other examples such as ceramic or silicon. The substrate 120 is a semiconductor substrate (e.g., silicon) in this example, but can be other than a semiconductor substrate in other examples, such as a ceramic material or a metallic cavity. In this example, a glass sheet 102 that is approximately 130-300 micrometers (dependent on interrogation wavelength) thick is bonded to a surface of semiconductor wafer 120. The process to bond the non-conductive structure 102 to conductive layer 104 on substrate 120 may comprise an anodic, fusion, eutectic solder, transition liquid phase (TLP), cofiring, or other suitable bonding processes.

FIG. 2B illustrates a second metal layer that has been deposited on a surface of the non-conductive structure 102 opposite the substrate 120 and patterned to form antenna 108. The metal layer 104 is a suitable metal material such as aluminum, copper, gold, etc. The conductive layer 104 is a ground plane for the antenna 108 patterned on the upper surface of the non-conductive structure 102. Antenna 108 has been patterned on a surface of the first dielectric layer 102 opposite the metal layer 104. The antenna 108 is patterned by removing a portion of a metal layer of a conductive material such as copper or gold. RF path 109 (FIG. 1) is also patterned from the same layer of conductive material and is connected to antenna 108 so that an electrical signal can be provided to the antenna or received from the antenna.

In some examples, one antenna is used to both transmit and receive signals. In other examples, a pair of antennas is patterned on the dielectric layer, and one antenna is used to launch a signal into the cavity and another antenna is used to receive a signal from the cavity 121. In such examples, the antennas are located at or near opposite ends of the cavity 121.

In FIG. 2C, a cavity 121 and sub-cavity 122 have been created in the substrate 120. In this example, cavity 121 and sub-cavity 122 are wet etched into the substrate 120 using a suitable wet etchant such as potassium hydroxide (KOH) or tetramethylammonium hydroxide (TMAH). Alternatively, the cavity 121 may be formed using other known or later developed etching techniques such as: reactive-ion etching (RIE), deep reactive-ion etching (DRIE), or isotropic etching. Cavity 121 and sub-cavity 122 are etched from the surface 126 of the substrate 120 opposite the non-conductive structure 102 to the nonconductive structure 102 thereby exposing a portion of the non-conductive structure 102.

FIG. 2D illustrates another metal layer 130 that has been deposited on a surface of the substrate 120 opposite the non-conductive structure 102. The metal layer 130 also is deposited in the cavity 121 and sub-cavity 122 as shown.

FIG. 2E illustrates irises 131, 132 that are created in the first conductive layer 104 and the second metal layer 130 within the respective cavities 121, 122

FIG. 2F shows another substrate 150 on which a metal layer 152 has been deposited. The substrate 150 may be the same or different material as substrate 120. In this example, the substrate 150 comprises a semiconductor substrate such as a silicon wafer but can be other than a semiconductor material in other examples.

FIG. 2G illustrates hermetic bonding structures 145 and porous bonding structures 146 that are deposited and patterned on either or both substrates 120 and 150. In this example, the bonding structures comprise a gold, aluminum, silicon or other type of material that form an alloy when heated to a suitable temperature. In this example, porous bonding structures 146 have channels etched to allow the interrogation gas to diffuse between cavity 121 and sub-cavity 122. In another example, porous bonding structure 146 may be fabricated using a porous material. In another example, a powdered material may be sintered to form porous bonding structures 146. In each example, a shared headspace is formed between cavity 121 and sub-cavity 122.

Trimming material 252 is placed on a region of substrate 150 that will be enclosed within sub-cavity 122. The use of trimming material 251 will be described in more detail hereinbelow. Prior to bonding substrate 150 to substrate 120, a gas containing selected interrogation molecules 251 is introduced into cavity 121. In this example, interrogation molecules 251 are also introduced into sub-cavity 122. In this example, the gas containing interrogation molecules 251 is placed in a bonding chamber at a selected pressure and density prior to bonding substrate 150 to substrate 120. Other known or later developed techniques may be used to introduce an initial density/pressure of interrogation molecules into chamber 121. As mentioned hereinabove, U.S. patent application Ser. No. 15/698,706 describes several techniques for depositing a measured amount of a selected interrogation species in a sealed cavity.

Figure 2H:
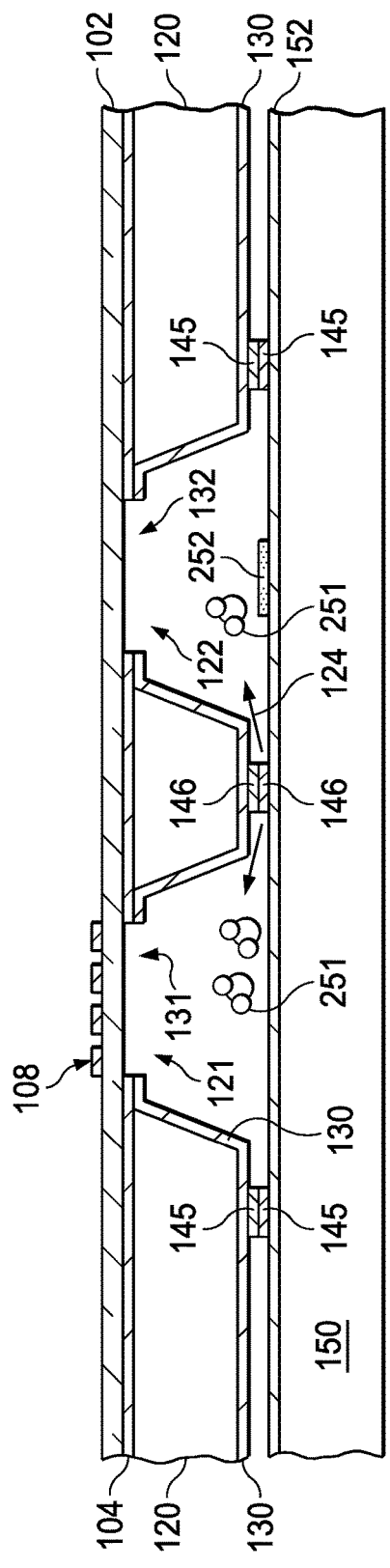

FIG. 2H illustrates the resulting device that includes a hermetically sealed region that includes cavity 121 and sub-cavity 122 formed by hermetic seal structure 145. A diffusion path 124 through porous sealing structure 146 allow molecules 251 to diffuse between cavity 121 and sub-cavity 122. In this manner, interrogation molecules 251 are enclosed within the cavity 121, but may be increased or decreased by diffusion to/from sub-cavity 122. In this example, hermetically sealed cavity 121 contains dipolar molecules (e.g., water molecules) at an internal pressure of less than, in one example, 0.15 mbars.

Figure 3:
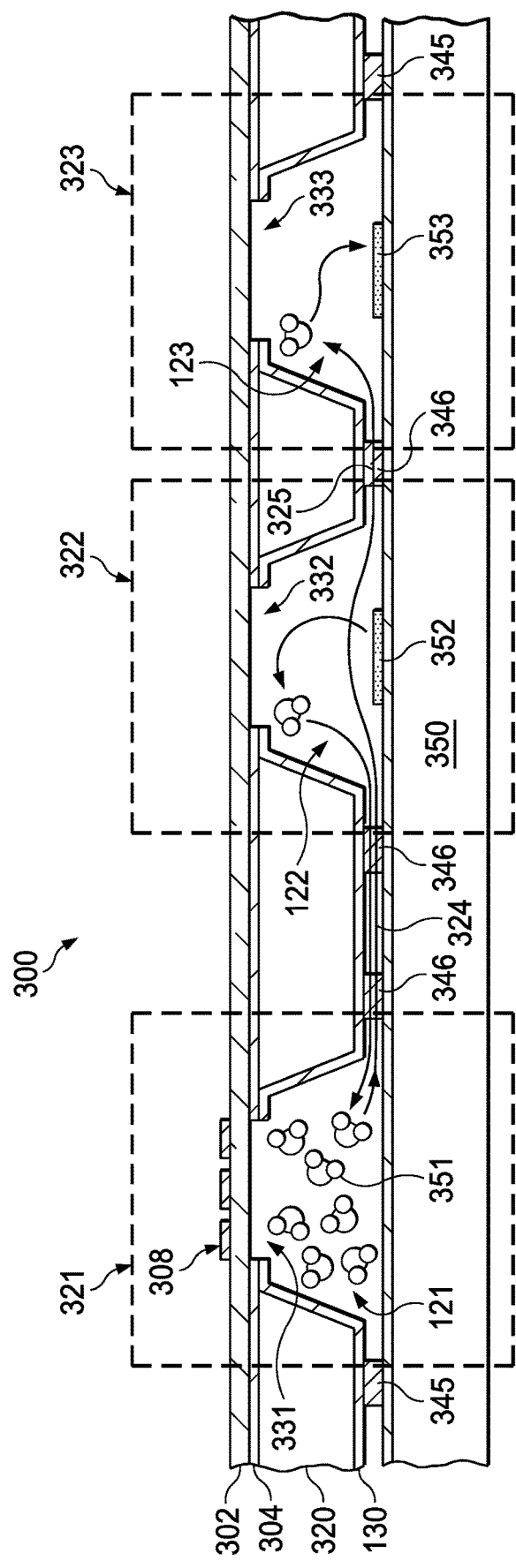
FIG. 3 is a cross-sectional view of an example spectroscopy cavity with multiple sub-cavities illustrating movement of interrogation molecules between the cavities.

FIG. 3 is a cross-sectional view of a portion of an example device 300 that includes a spectroscopy cell 321 with multiple sub-cells 322, 323 illustrating movement of interrogation molecules 351 between the shared headspace of the spectroscopy cell and the sub-cells. Device 300 is similar to device 100 (FIG. 1) and is fabricated in a similar manner.

In this example, cell 321 and sub-cells 322, 323 include cavities 121, 122, 123 respectively that are microfabricated in a first substrate 320, such as a semiconductor wafer. A second substrate 350, such as a semiconductor wafer, is then bonded to substrate 320 to thereby enclose cavity 121 and sub-cavities 122, 123 to encapsulate an interrogation gas 351 within cavity 121. A metal layer 304 is deposited on a surface of the substrate 320. The metal layer 304 is a suitable metal material such as copper, gold, etc. and acts as a ground plane. In this example, an insulating layer 302, such as glass, is bonded to the exposed surface metal layer 304. A first iris 331, a second iris 332 and a third iris 333 have been patterned in the metal layer 304. A launch structure 308 is patterned from a second conductive layer formed on a surface of insulating layer 302 and is coupled to transmitter circuity (not shown) by radio frequency (RF) path (not shown).

As described in more detail hereinabove, hermetic bonding structures 345 and porous bonding structures 346 are deposited and patterned on either or both substrates 320 and 350. In this example, the bonding structures comprise a gold, aluminum, silicon or other type of material that form an alloy when heated to a suitable temperature. In this example, porous bonding structures 346 have channels etched to allow the interrogation gas to diffuse between cell 321 and sub-cells 322, 323 in a shared headspace.

In this example, a precursor material 352 for interrogation molecules 351 is deposited on a region of substrate 350 that will be encapsulated within sub-cell 322. Similarly, a getter material 353 for interrogation molecules 351 is deposited on a region of substrate 350 that will be encapsulated within sub-cell 323. In another example, the location of precursor material 352 and getter material 342 may be reversed.

After fabrication of device 300 is complete, the density/pressure of interrogation molecules 351 within cell 321 may be increased by activation of precursor material 352 or may be decreased by activation of getter material 353. Interrogation molecules 351 can diffuse between cell 321 and sub-cells 322, 323 via diffusion paths 324, 325 that traverse through porous bonding structures 346, as will be described in more detail hereinbelow.

In this figure, two sub-cells are illustrated. However, in various examples many sub-cells may be provided, as will be described in more detail hereinbelow. Sub-cells may be positioned on all sides of cell 321. Cell 321 may be in a serpentine or split structure to increase mmW absorption path length or SNR (signal to noise ratio). Sub-cells may be interspersed throughout the design.

Figure 4A:
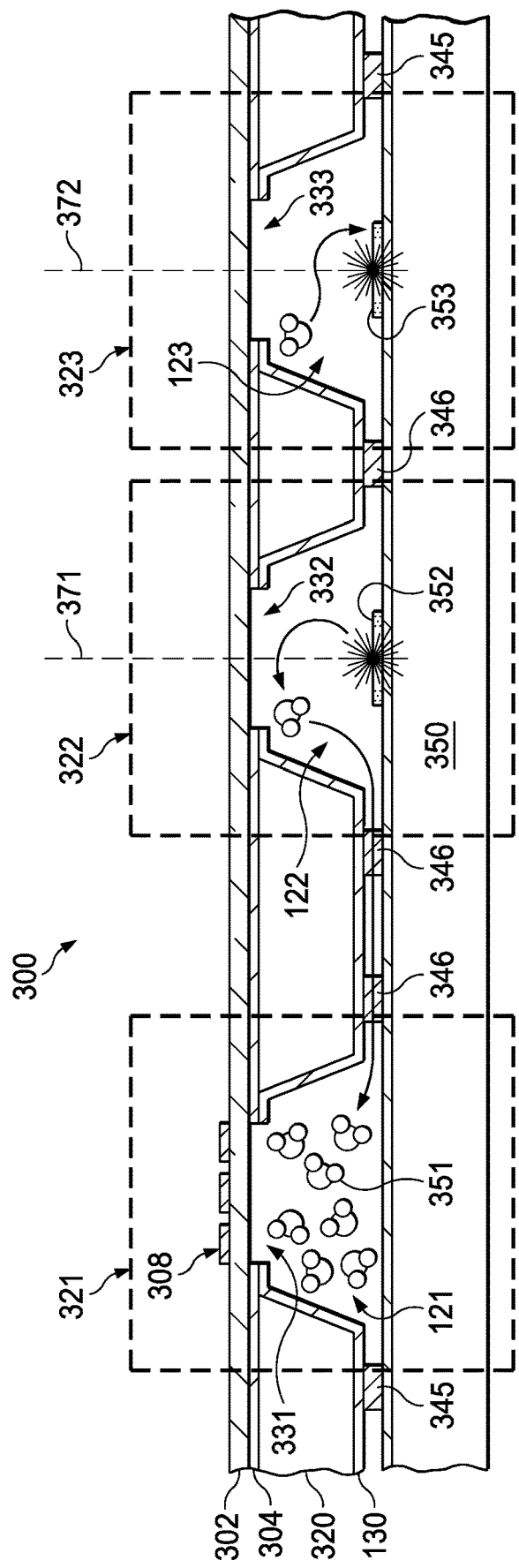
FIGS. 4A-4B are a cross-sectional view and a top view of an example device using laser activation of trimming material in sub-cavities.
Figure 4B:
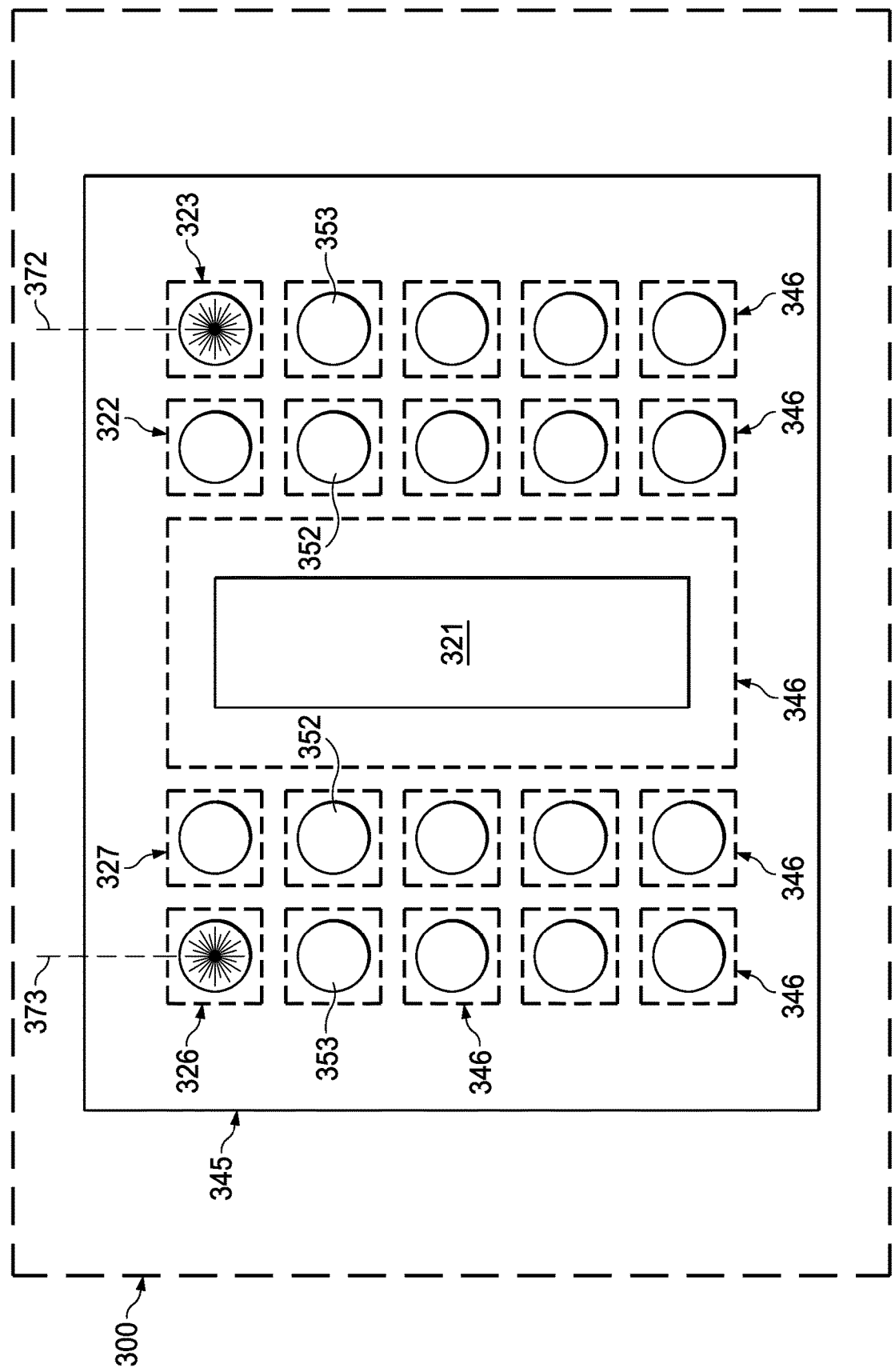

FIG. 4A is a cross-sectional view and FIG. 4B is a top view of a portion of the example device 300 (FIG. 3) using laser activation of trimming material 352, 353 in sub-cells 322, 323 respectively. FIG. 4B illustrates columns of sub-cells 322, 323 on one side of cell 321 and columns of sub-cells 326, 327 on an opposite side of cell 321. Sub-cells 326 are similar to sub-cells 323 and include getter material 353. Sub-cells 327 are similar to sub-cells 322 and include precursor material 352.

FIG. 4B illustrates how hermetic seal structure 345 surrounds cell 321 and all the sub-cells 322, 323, 326, 327. Porous bond structures 346 allow interrogation molecules 351 to diffuse between cell 321 and the sub-cells in a shared headspace in response to activation of the trimming material 352, 353 included within the sub-cells.

In this example, a laser beam, such as laser beam 371, 372, 373, may be projected into any of the sub-cells 322, 323, 326, 327 through an iris, such as iris 332, 333, that is fabricated in each sub-cell as described in more detail hereinabove. For example, laser beam 371 may be projected into sub-cell 322 to thereby heat precursor material 352 and cause precursor material 352 to release additional interrogation molecules 351 that diffuse through porous seal structure 346 and thereby increase the density/pressure of interrogation molecules within cell 321. Similarly, laser beam 372 may be projected into sub-cell 323 to thereby heat getter material 353 and cause getter material 353 to combine with a portion of the interrogation molecules 351 that diffuse through porous seal structure 346 and thereby decrease the density/pressure of interrogation molecules within cell 321.

In this example, each of the sub-cells in each of the columns of sub-cells is approximately the same size and contain approximately the same amount of trimmer material 352 or 353. In another example, some sub-cells may be larger than other sub-cells and contain different amounts of trimmer material 352 or 353. Despite illustration as equal sized cells for simplicity, practical implementation may size some cells with a $2^n$ or other exponential relationship.

Figure 5A:
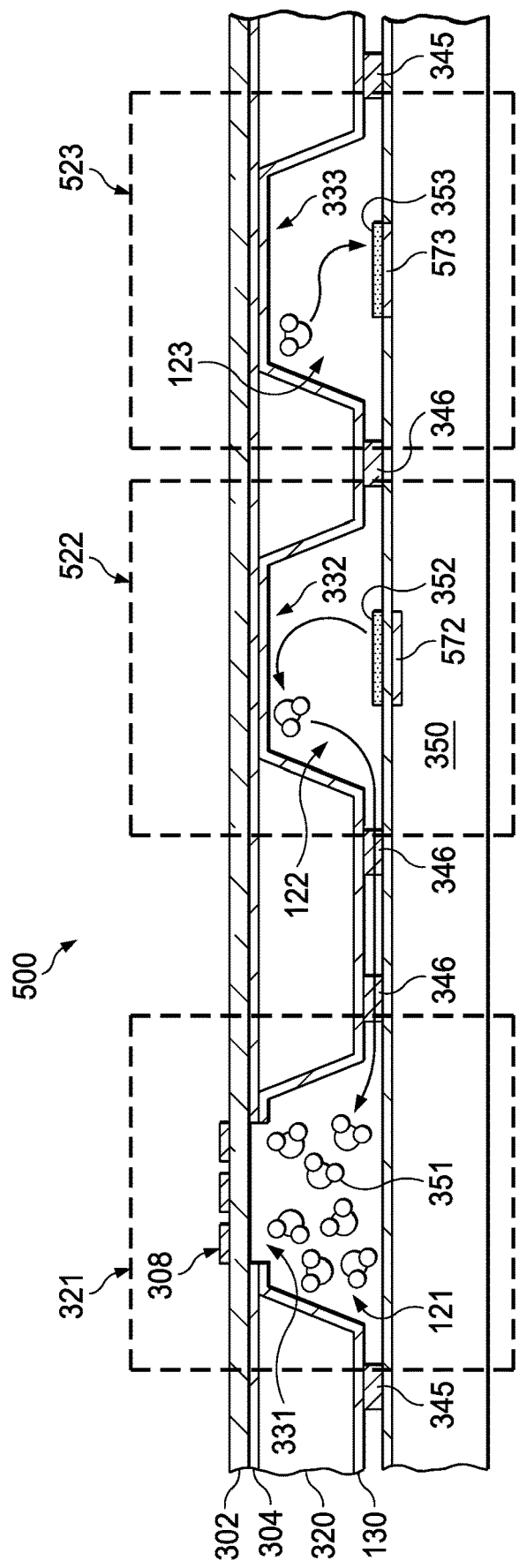
FIGS. 5A-5B are a cross-sectional view and a top view of an example device using resistive heater activation of trimming material in sub-cavities.
Figure 5B:
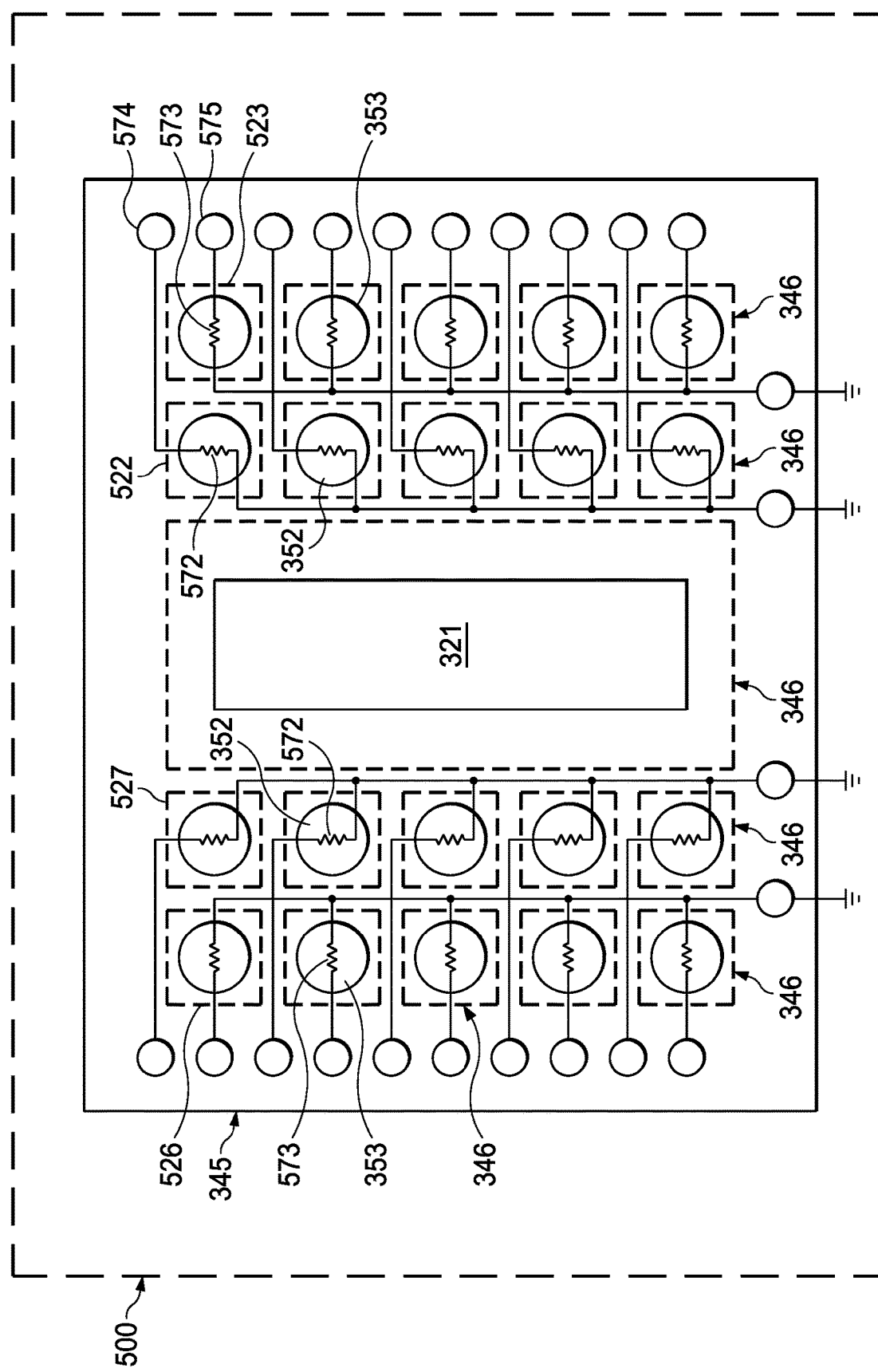

FIG. 5A is a cross-sectional view and FIG. 5B is a top view of a portion of another example device 500 that uses a resistive heater to activate trimming material 352, 353 in sub-cells 522, 523 respectively. FIG. 5B illustrates columns of sub-cells 522, 523 on one side of cell 321 and columns of sub-cells 526, 527 on an opposite side of cell 321. Sub-cells 526 are similar to sub-cells 523 and include getter material 353. Sub-cells 527 are similar to sub-cells 522 and include precursor material 352.

Device 500 is similar to device 300 (FIG. 3) and may be fabricated in a similar manner. However, device 500 includes a resistive heater element positioned beneath each portion of trimming material, such as resistive heating elements 571, 572. In this example, irises 332, 333 (FIG. 3) are not needed since the resistive heaters provide activation heat of the trimming material included within each sub-cell. Separate connections, such as heater leads 574, 575 are provided to each heater element in all the sub-cells. A return path to ground or to another voltage source is provided for each heater element.

FIG. 5B illustrates how hermetic seal structure 345 surrounds cell 321 and all the sub-cells 522, 523, 526, 527. Porous bond structures 346 allow interrogation molecules 351 to diffuse between cell 321 and the sub-cells in a shared headspace in response to activation of the trimming material 352, 353 included within the sub-cells.

In this example, each heater element may be separately energized during post fabrication testing or during operation of device 500 in the field. For example, heater element 522 in sub-cell 522 may be energized by providing a current via heater lead 574 to thereby heat precursor material 352 and cause precursor material 352 to release additional interrogation molecules 351 that diffuse through porous seal structure 346 and thereby increase the density/pressure of interrogation molecules within cell 321. Similarly, heater element 573 in sub-cell 523 may be energized by providing a current via heater lead 575 to thereby heat getter material 353 and cause getter material 353 to combine with a portion of the interrogation molecules 351 that diffuse through porous seal structure 346 and thereby decrease the density/pressure of interrogation molecules within cell 321.

Each heater lead may be controlled by a fuse or may be dynamically activated by control logic. Each heater element may be energized in response to test equipment during testing of device 500 at the completion of fabrication. During the operating life of device 500, additional trimming may be performed under control of logic that is included with device 500 or logic that is coupled to device 500, as will be described in more detail hereinbelow.

In this example, each of the sub-cells in each of the columns of sub-cells is approximately the same size and contain approximately the same amount of trimmer material 352 or 353. In another example, some sub-cells may be larger than other sub-cells and contain different amounts of trimmer material 352 or 353.

Figure 6A:
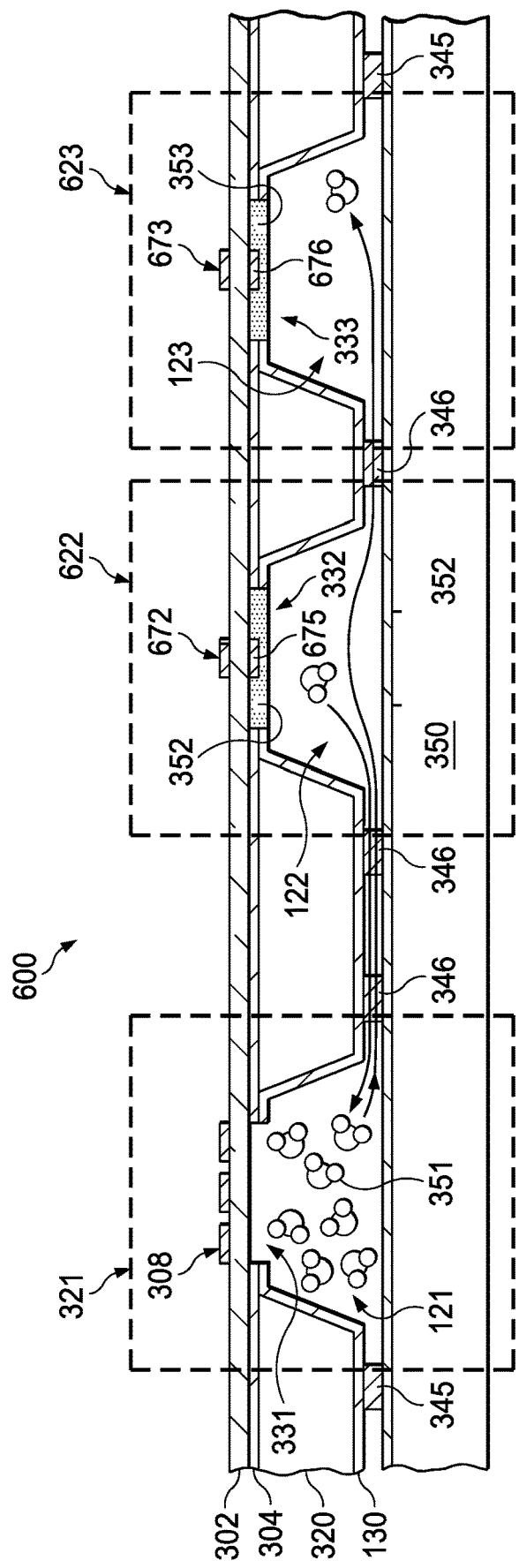
FIGS. 6A-6B are a cross-sectional view and a top view of an example device using inductive heater activation of trimming material in sub-cavities.
Figure 6B:
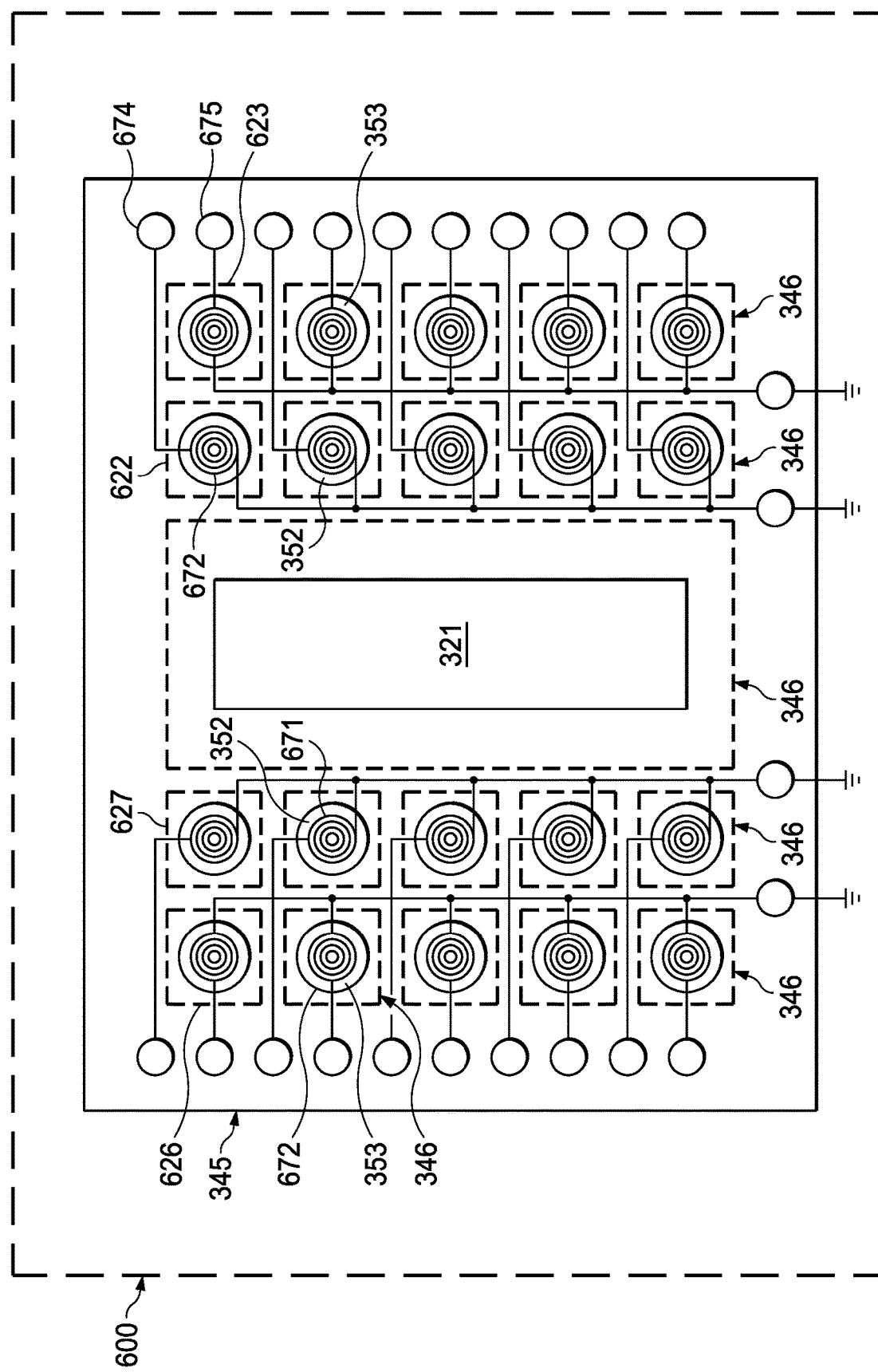

FIGS. 6A-6B are a cross-sectional view and a top view of an example device using inductive heater activation of trimming material in sub-cells.

FIG. 6A is a cross-sectional view and FIG. 6B is a top view of a portion of another example device 600 that uses an inductive heater to activate trimming material 352, 353 in sub-cells 622, 623 respectively. FIG. 5B illustrates columns of sub-cells 622, 623 on one side of cell 321 and columns of sub-cells 626, 627 on an opposite side of cell 321. Sub-cells 626 are similar to sub-cells 623 and include getter material 353. Sub-cells 627 are similar to sub-cells 622 and include precursor material 352.

Device 600 is similar to device 300 (FIG. 3) and may be fabricated in a similar manner. However, device 600 includes an inductive heater element positioned above each portion of trimming material, such as inductive heater elements 671, 672. Separate connections, such as heater leads 574, 575 are provided to each inductive element in all the sub-cells. A return path to ground or to another voltage source is provided for each heater element. Each inductive element is a coil formed by etching a pattern in a conductive layer on the surface of insulating layer 302. A high frequency signal is selectively applied to each inductive heating element to create an oscillating magnetic field that couples into the patch of trimming material located adjacent each inductive heating element. Eddy currents induced in the trimming material then create heat that activates the trimming material. In this example, the conductivity of the trimming material is low, so a conductive material, such as electrically conductive material 675, 676, is placed in proximity to each respective patch of trimming material. In this manner, the electrically conductive material is heated by induced eddy currents.

FIG. 6B illustrates how hermetic seal structure 345 surrounds cell 321 and all the sub-cells 622, 623, 626, 627. Porous bond structures 346 allow interrogation molecules 351 to diffuse between cell 321 and the sub-cells in a shared headspace in response to activation of the trimming material 352, 353 included within the sub-cells.

In this example, each inductive heater element may be separately energized during post fabrication testing or during operation of device 600 in the field. For example, inductive heating element 672 may be energized by a high frequency current via heater lead 623 to induce a current in conductive material 675 and thereby heat conductive material 675 and precursor material 352 located proximate conductive material 675. and cause precursor material 352 to release additional interrogation molecules 351 that diffuse through porous seal structure 346 and thereby increase the density/pressure of interrogation molecules within cell 321. Similarly, inductive heating element 673 in sub-cell 623 may be energized by providing a high frequency current via heater lead 675 to thereby heat conductive material 676 and getter material 352 located proximate conductive material 675 and cause getter material 353 to combine with a portion of the interrogation molecules 351 that diffuse through porous seal structure 346 and thereby decrease the density/pressure of interrogation molecules within cell 321.

Each heater lead may be controlled by a fuse or may be dynamically activated by control logic. Each inductive heater element may be energized in response to test equipment during testing of device 600 at the completion of fabrication. During the operating life of device 600, additional trimming may be performed under control of logic that is included with device 600 or logic that is coupled to device 600, as will be described in more detail hereinbelow.

In this example, each of the sub-cells in each of the columns of sub-cells is approximately the same size and contain approximately the same amount of trimmer material 352 or 353. In another example, some sub-cells may be larger than other sub-cells and contain different amounts of trimmer material 352 or 353.

Figure 7:
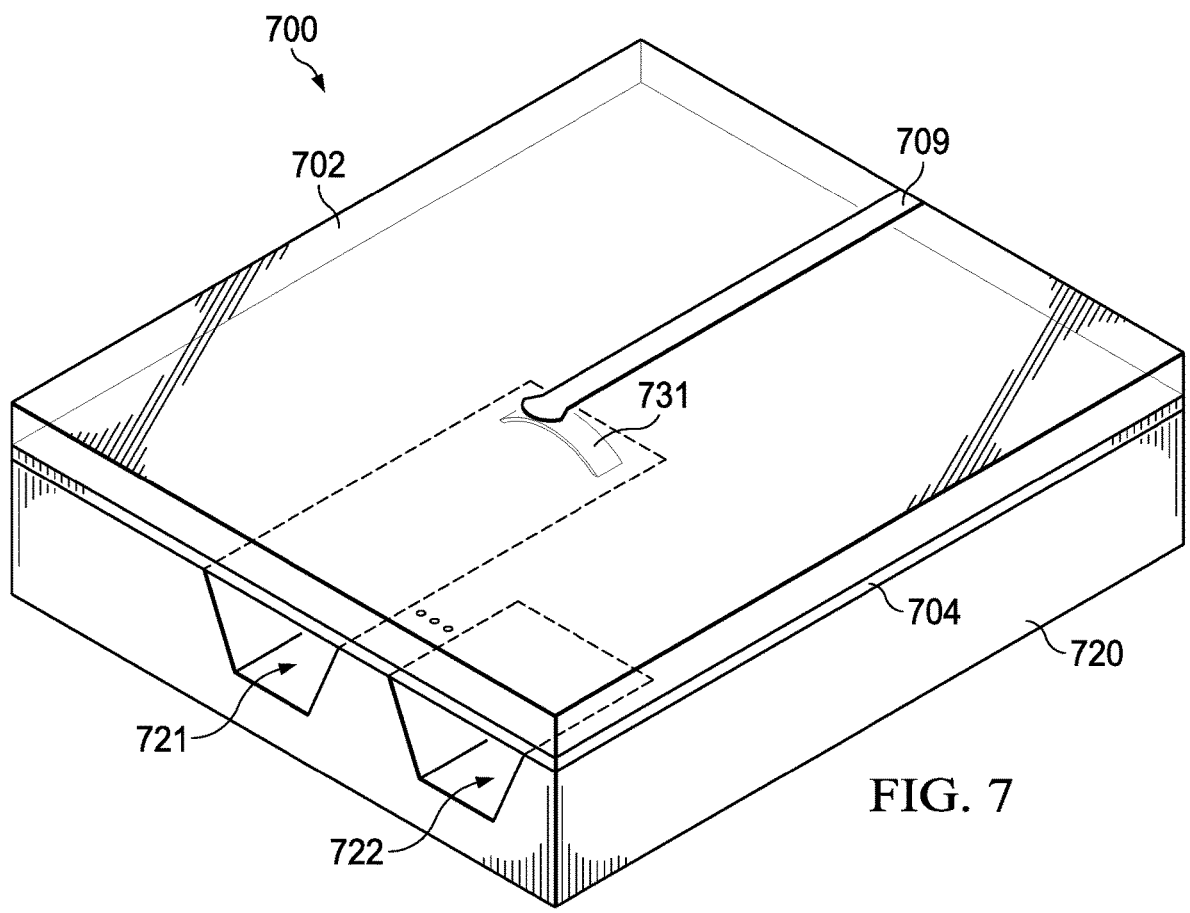
FIG. 7 is an isometric cross-sectional view of another example hermetically sealed cavity and sub-cavity that may be used as a spectroscopy cavity.

FIG. 7 is an isometric cross-sectional view of another example device 700 that includes hermetically sealed cell 721 that may be used as a spectroscopy cell and sub-cell 722. While only a single sub-cell 722 is illustrated in the figure, multiple sub-cells may be implemented as described hereinabove in more detail. Substrate 720 is shown with a conductive layer 704 bonded to non-conductive structure 702, such as glass, with a hermetically sealed cell 721 and sub-cell 722 formed in the substrate 720. Conductive layer 704 on substrate 720 is patterned to form an iris 731, as described hereinabove in more detail. The iris 731 permits electromagnetic energy to pass through the non-conductive structure 702 and conductive layer 704 from the antenna 708 into the cell 721. A transmission line 709 also is formed on the exterior surface of the non-conductive structure 702 and is used to convey a radio frequency (RF) signal to/from the cell. Layer 704 provides a common ground plane for all RF structures external to the cell 121. In addition, it limits propagation of waves travelling in layer 720. The dimensions of the waveguide, antenna, and size and positioning of the iris 731 are all design considerations based on the chosen molecular species inside the cell and the wavelength of the interrogation waveform within the cell. The required bandwidth of the structure depends upon the fabrication tolerances achievable in manufacturing.

In this example, iris 731 is a chevron shape formed in conductive layer 704. antenna 708 is illustrated as a microstrip with an end that overlies iris 731. In other examples, various launch structures may be used in place of antenna 704, such as an inductive loop formed in an iris and fed by a waveguide, a microstrip over a bowtie shaped iris, an array of vias formed in place of an iris and fed by a waveguide, a coplanar waveguide that is transitioned into a coaxial waveguide, etc. These and other launch structures are described in more detail in U.S. patent application Ser. No. 15/681,541 entitled "LAUNCH STRUCTURES FOR A HERMETICALLY SEALED CAVITY," filed on 21 Aug. 2017, which is incorporated by reference herein.

The various configurations of sealed chambers and trimming techniques described hereinabove may be used for various applications, such as laser spectroscopy, high accuracy clocks, and other molecular transitions.

System Example

Figure 8:
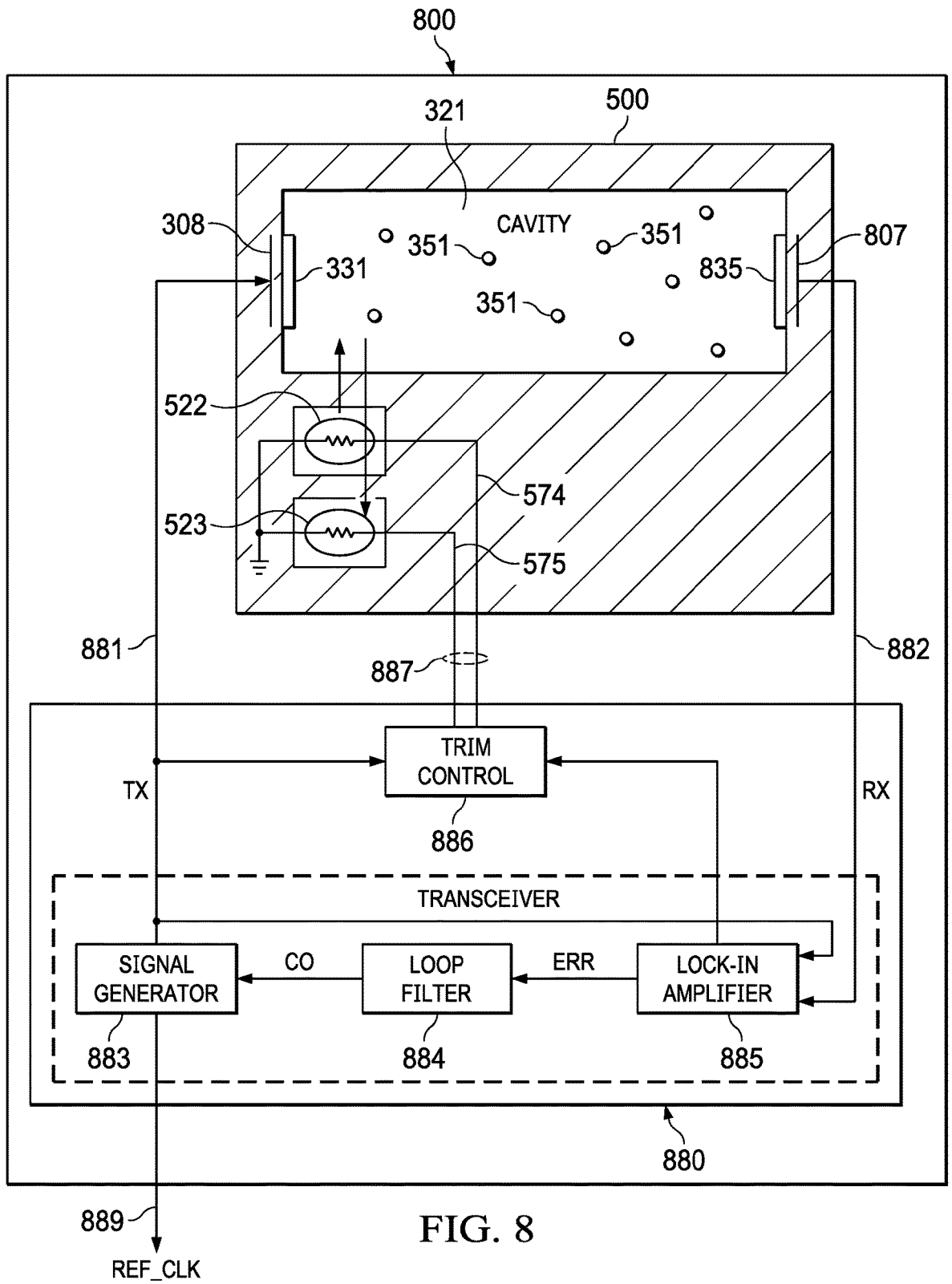
FIG. 8 is a block diagram of an example clock generator system that includes a spectroscopy cavity.

FIG. 8 is a block diagram of an example atomic clock generator 800 that includes a spectroscopy device 500. In this example, only two sub-cells 522, 523 are illustrated for simplicity, but as described hereinabove in more detail with regard to FIGS. 5A, 5B, device 500 may include many sub-cells similar to sub-cells 522, 523 that each contain trimming material.

Clock generator 800 is a millimeter wave atomic clock that generates a reference frequency signal 889 based on the frequency of quantum rotation of selected dipolar molecules 351 contained in hermetically sealed cell 321 formed in semiconductor material. The reference frequency produced by quantum rotation of the selected dipolar molecules is unaffected by circuit aging and does not vary with temperature or other environmental factors.

Clock generator 800 includes a transceiver 880 with a transmit output 881 for providing a millimeter wave electrical transmit signal (TX) to cell 321, as well as a receiver input 882 for receiving an electrical input signal (RX) from the cell 321. Spectroscopy device 500 does not require optical interrogation, and instead operates through electromagnetic interrogation via the transmit and receive signals (TX, RX) provided by the transceiver 880.

Sealed cell 321 includes a conductive interior cavity surface, as well as first and second non-conductive irises 331 and 835 formed in the interior cavity surface for providing an electromagnetic field entrance and an electromagnetic field exit, respectively. In one example, irises 331, 835 magnetically couple into the TE10 mode of the cell 321. In other examples, irises 331, 835 excite higher order modes. First and second conductive coupling structure 308, 807 are formed on an outer surface of cell 321 proximate the first and second non-conductive irises 331 and 835, respectively. The coupling structures 308, 807 are antenna(s) as described hereinabove and may include a conductive strip formed on a surface of one of the substrates forming the cell 321. Coupling structure 308 overlies the non-conductive iris 331 for providing an electromagnetic interface to couple a magnetic field into cell 321 from the transmit signal TX from the transceiver output 881. Similarly, coupling structure 807 overlies the non-conductive iris 835 for providing an electromagnetic interface to couple a magnetic field from cell 321 to the transceiver RX input 882. The proximate location of the conductive coupling structures 308, 807 and the corresponding non-conductive irises 331, 835 provides electromagnetic transmissive paths through the second or upper substrate 302 (FIG. 3), which can be any electromagnetic transmissive material.

In this example, representative sub-cells 522, 523 have individual heater leads 574, 575 coupled to control logic 886 on transceiver 880. In addition, heater leads from other sub-cells that are omitted from the figure for simplicity are also included in heater lead bundle 887 and coupled to control logic 886

In this example, transceiver circuit 880 is implemented in an integrated circuit (IC) die, to which the cell device 500 is electrically coupled for transmission of the TX signal via the output 881 and for receipt of the RX signal via the input 882. Transceiver 880 is operable when powered for providing an mmW electrical output signal TX to the first conductive coupling structure 308 for coupling an electromagnetic field to the interior of the cell 321, as well as for receiving the alternating electrical input signal RX from the second conductive coupling structure 807 representing the electromagnetic field received from the cell 321. The transceiver circuit 880 is operable for selectively adjusting the frequency of the mmW output signal TX to reduce the mmW input signal RX by interrogation to operate the clock generator 883 at a frequency that substantially maximizes the molecular absorption through rotational state transitions.

A reference clock signal REF_CLK 889 is provided as an output for use by another device or system. In this example, the frequency of reference clock 889 is reduced by a frequency divider circuit with a divisor N from the frequency of the TX output signal 881. In another example, the reference clock frequency may be the same as TX output signal 881. The REF_CLK signal from the signal generator 883 can be provided to other circuitry such as frequency dividers and other control circuits requiring use of a clock.

In this example, the transceiver 880 includes a signal generator 883 with an output 881 electrically coupled with the first conductive coupling structure 308 for providing the mmW output signal TX, and an output for providing the reference clock signal REF_CLK 889 at the corresponding transmit output frequency. The transceiver 880 also includes a lock-in amplifier circuit 885 with an input 882 coupled from the second conductive coupling structure 807 for receiving the RX signal. The lock-in amplifier operates to provide an error signal ERR representing a difference between the RX signal and the electrical output signal TX. In one example, the lock-in amplifier 606 provides the error signal ERR as an in-phase output, and the error signal ERR is used as an input by a loop filter 884 to provide a control output signal (CO) to the signal generator 883 for selectively adjusting the TX output signal frequency to maintain this frequency at a peak absorption frequency of the dipolar molecular gas inside the sealed interior of the cell 321. In some examples, the RF power of the TX and RX loop is controlled to avoid or mitigate stark shift affects.

The electromagnetic coupling via the non-conductive apertures 331, 835 and corresponding conductive coupling structures 308, 807 facilitates electromagnetic interrogation of the dipolar gas 351 within the cavity of cell 321. In one non-limiting form of operation, the clock generator 800 operates with the signal generator 883 transmitting mmW TX signals at full transmission power at various frequencies within a defined band around a known quantum absorption frequency at which the transmission efficiency of the vapor cell 321 is maximum. For example, the quantum absorption frequency associated with the dipolar water molecule is 183.31 GHz. The molecular absorption can be quite small, on the order of less than 1%, in many cases. The signal generator 883 hunts for this dip and locks onto it. When the system operates at the quantum frequency, a null or minima is detected at the receiver via the lock-in amplifier 885, which provides the error signal ERR to the loop filter 884 for regulation of the TX output signal frequency via the control output CO signal provided to the signal generator 883. The rotational quantum frequency of the dipolar molecule gas in the vapor cell 321 is generally stable with respect to time (does not degrade or drift over time) and is largely independent of temperature and several other variables.

In one example, the signal generator 883 initially sweeps the transmission output frequency through a band known to include the quantum frequency of the cell 321. For example, transitioning upward from an initial frequency below the suspected quantum frequency, or initially transitioning downward from an initial frequency above the suspected quantum frequency, or other suitable sweeping technique or approach. The transceiver 880 monitors the received energy via the input 882 coupled with (e.g., electrically connected to) the second conductive coupling structure 807 to identify the transmission frequency associated with peak absorption by the gas in the cell 321. Peak absorption results in minimal reception at the receiver, which is referred to as an "absorption dip." Once the quantum absorption frequency is identified, the loop filter 884 moves the source signal generator transmission frequency close to that absorption frequency (e.g., 183.31 GHz), and modulates the signal at a very low frequency to regulate operation around the null or minima in the transmission efficiency representing the ratio of the received energy to the transmitted energy. The loop filter 884 provides negative feedback in a closed loop operation to maintain the signal generator 883 operating at a TX frequency corresponding to the quantum frequency of the cavity dipolar molecule gas.

In steady state operation, the lock-in amplifier 885 and the loop filter 884 maintain the transmitter frequency at the peak absorption frequency of the cell gas 351. In one non-limiting example, the loop filter 884 provides proportional-integral-derivative (PID) control using a derivative of the frequency error as a control factor for lock-in detection and closed loop regulation. At the bottom of the null in a transmission coefficient curve caused by the absorption dip, the derivative is zero and the loop filter 884 provides the derivative back as a direct current (DC) control output signal CO to the signal generator 883. This closed loop operates to keep the signal generator transmission output frequency at the peak absorption frequency of the cell gas using lock-in differentiation based on the RX signal received from the cell 321.

Trim control circuit 886 can be operated to increase or decrease the density/pressure of the interrogation molecules 351 within the cavity of cell 321 by energizing the heaters via individual heater leads 887 in one or more of the sub-cells to thereby activate the getter material or the precursor material, as described hereinabove in more detail. The RX 882 signal amplitude of the absorption dip can be determined by lock-in amplifier 885 and cause trim control circuitry to activate either a sub-cell with getter material to reduce interrogation molecule 351 density/pressure or a sub-cell with precursor material to increase interrogation molecule 351 density/pressure. This may be done to improve the absorption of the interrogation molecules 351 such that the minimum signal received on TX 882 for the absorption dip falls below a selected threshold value or within a selected band of values.

Trim control circuit 886 may be operated on an occasional manner while clock generator system 800 is in use in the field in a final product to maintain sensitivity and accuracy over the life of the device. In this example, trim control circuit 886 is designed to monitor the amplitude of RX signal 882 and take corrective action when the amplitude of the absorption dip drifts past a selected threshold value.

While this example makes use of a device with resistive heaters, other examples may make use of a device with inductive heaters, such as device 600 (FIG. 6A), a system that uses lasers to create laser beams, such as device 300 (FIG. 4A), or other known or later developed techniques for activating the precursor and getter materials.

In this example, atomic clock generator 800 is packaged in a single integrated circuit (IC) package. Various types of known or later developed IC packaging techniques may be used to package atomic clock generator 800, such as QFN (quad flat no lead), DFN (dual flat no lead), MLF (micro lead frame), SON (small outline no lead), flip chips, dual inline packages (DIP), etc. In this example, transceiver 880 is fabricated on a separate semiconductor substrate using known or later developed semiconductor processing techniques and connected to spectroscopy device 500 using wire bonds. Other examples may use other known or later developed techniques to interconnect the device 500 and transceiver 880, such as stacked dies, etc.

Figure 9:
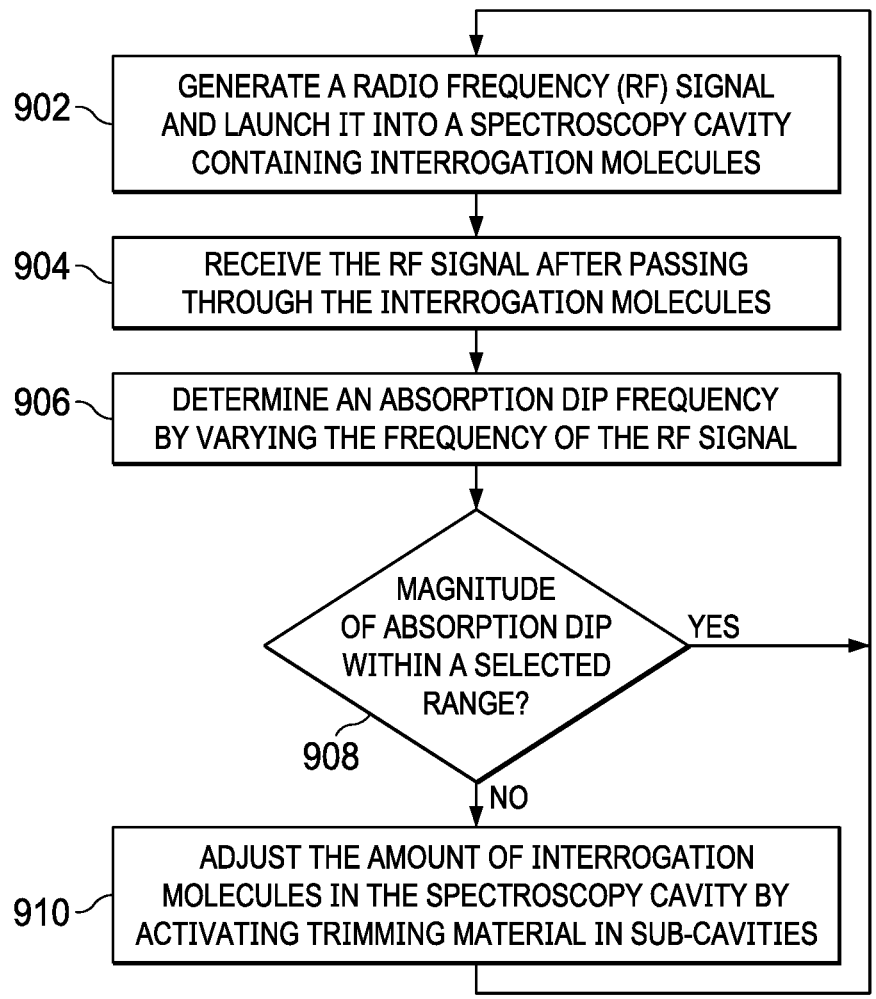
FIG. 9 is a flow diagram of operation of an example spectroscopy cavity.

FIG. 9 is a flow diagram of operation of an example spectroscopy cell. Several example spectroscopy cells have been described hereinabove and each may be operated as described hereinbelow.

At 902, an RF signal is generated and launched into a cavity of a spectroscopy cell included within a device, such as device 300 (FIG. 3), device 500 (FIGS. 5A, 5B), device 600 (FIGS. 6A, 6B), or device 700 (FIG. 7). The cavity of the spectroscopy cell encloses a gas that includes interrogation molecules at a particular density or pressure.

At 904, the RF signal passes through the gas having the interrogation molecules and is received by a control circuit, such as transceiver 880 (FIG. 8). A portion of the energy of the RF signal may be absorbed by the interrogation molecules when the frequency of the RF signal matches or is close to the quantum absorption frequency of the interrogation molecules.

At 906, the frequency of the RF signal is varied across a range to determine a frequency that matches the quantum absorption frequency of the interrogation molecules and thereby creates an absorption dip in the magnitude of the RF signal received by the control circuit from the spectroscopy cell. In one example, the frequency at which the absorption dip is maximum is determined when a derivative of an error signal between the received RF signal and the transmitted RF signal is zero, as described hereinabove in more detail.

At 908, the magnitude of the RF signal absorption dip is compared to a selected threshold or range of magnitude values. When the magnitude of the absorption dip is within the selected range, then operation of the spectroscopy cell continues at 902. In some examples, a single threshold value may be used.

At 910, when the magnitude of the RF signal absorption dip is outside of the selected range or past a selected threshold, then the amount of interrogation molecules within the spectroscopy cavity is adjusted. Control circuitry, such as trim control circuit 886 (FIG. 8), can be operated to increase or decrease the density/pressure of the interrogation molecules within the spectroscopy cavity by activating trimming material that is contained within sub-cavities that are coupled to the spectroscopy cavity by diffusion paths to form a shared headspace. The amount of interrogation molecules in the spectroscopy cavity is increased by activating a precursor material in one or more sub-cavities having a diffusion path to the spectroscopy cavity. The amount of interrogation molecules in the spectroscopy cavity is reduced by activating a getter material in one or more of the sub-cavities having a diffusion path to the spectroscopy cavity.

As described hereinabove in more detail, various techniques may be used to activate the trimming material, such as by energizing a resistive heating element proximate to the trimming material in each sub-cavity, energizing an inductive heater element proximate to the trimming material in each sub-cavity, by projecting a laser beam onto the trimming material in each sub-cavity, etc.

This sequence is repeated at 902 to form a feedback loop to lock onto the absorption dip in the RF signal received from the spectroscopy cell.

This process may be performed after fabrication of a device to adjust an initial density/pressure of interrogation molecules within a spectroscopy cavity.

This process may be performed in a continuous manner or in an occasional manner after a spectroscopy device is installed in a system and deployed in the field to compensate for any drift that may occur over the operating lifetime of the spectroscopy device.

In this manner, the amount of interrogation molecules in a sealed cavity may be adjusted by activating a precursor material in one or more sub-cavities coupled to the sealed cavity by a diffusion path to increase the amount of interrogation molecules or by activating the getter material in one or more sub-cavities coupled to the sealed cavity by a diffusion path to decrease the amount of interrogation molecules.

In some examples, multiple types of getter material and/or precursor materials may be included within various ones of the sealed cavities for specific versus generic trimming of the interrogation molecules.

In this description, the term "couple" and derivatives thereof mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Modifications are possible in the described examples, and other examples are possible, within the scope of the claims.

What is claimed is:

1. A device comprising:
    a substrate having a spectroscopy cavity and first, second, third and fourth sub-cavities, the spectroscopy cavity coupled to the first sub-cavity by a first diffusion path and to the second sub-cavity by a second diffusion path to form a shared headspace;
    gaseous interrogation molecules within the shared headspace;
    first trimming material within the first and third sub-cavities; and
    second trimming material within the second and fourth sub-cavities.

2. The device of claim 1, further comprising a resistive heater adjacent the first trimming material and configured to activate the first trimming material.

3. The device of claim 1, further comprising an inductive heater adjacent the first trimming material and configured to activate the first trimming material.

4. The device of claim 1, wherein the first trimming material is a precursor material for the gaseous interrogation molecules.

5. The device of claim 1, wherein the first trimming material is a getter material for the gaseous interrogation molecules.

6. The device of claim 1, wherein the first trimming material is a precursor material for the gaseous interrogation molecules, and the second trimming material is a getter material for the gaseous interrogation molecules.

7. The device of claim 1, wherein the first sub-cavity and the second sub-cavity are located on opposite sides of the spectroscopy cavity.

8. The device of claim 1, wherein the first sub-cavity is larger than the second sub-cavity.

9. A device comprising:
    a substrate having a spectroscopy cavity and a sub-cavity, the spectroscopy cavity coupled to the sub-cavity by a diffusion path to form a shared headspace;
    gaseous interrogation molecules within the shared headspace;
    trimming material within the sub-cavity;
    transceiver circuitry coupled to the spectroscopy cavity and configured to provide millimeter wave (mmW) energy to the spectroscopy cavity and to receive a mmW signal from the spectroscopy cavity; and
    control logic coupled between the transceiver circuitry and the trimming material, the control logic configured to activate the trimming material responsive to the received mmW signal;
    wherein the substrate, the gaseous interrogation molecules, the trimming material, the transceiver circuitry, and the control logic are packaged together in a single integrated circuit package.

10. A method for fabricating a spectroscopy device, the method comprising:
    forming substrate having a spectroscopy cavity and sub-cavities;
    forming at least one diffusion path between the spectroscopy cavity and the sub-cavities to form a shared headspace;
    placing a precursor material in a portion of the sub-cavities and a getter material in another portion of the sub-cavities;
    placing gaseous interrogation molecules within the shared headspace; and
    adjusting an amount of the gaseous interrogation molecules by projecting a laser beam into at least one of the sub-cavities.

11. The method of claim 10, further comprising:
    providing millimeter wave (mmW) energy to the spectroscopy cavity; and receiving the mmW energy after it traverses the spectroscopy cavity;

wherein adjusting the amount of the gaseous interrogation molecules includes activating the precursor material in at least one of the sub-cavities to increase the amount of the gaseous interrogation molecules or activating the getter material in at least one of the sub-cavities to decrease the amount of the gaseous interrogation molecules, while using a feedback loop to lock onto an absorption dip in the mmW energy received from the spectroscopy cavity.

12. The method of claim 10, wherein adjusting the amount of the gaseous interrogation molecules includes adjusting the amount of the gaseous interrogation molecules in the spectroscopy cavity while the spectroscopy device is deployed in a system.

13. The method of claim 10, wherein adjusting the amount of the gaseous interrogation molecules includes energizing a heater element adjacent the precursor material or adjacent the getter material.

14. A method for operating a spectroscopy device, the method comprising:

providing millimeter wave (mmW) energy to a spectroscopy cavity of the spectroscopy device, wherein the spectroscopy cavity is coupled to sub-cavities with a shared headspace that contains interrogation molecules;

receiving the mmW energy after it traverses the spectroscopy cavity; and adjusting an amount of the interrogation molecules by projecting a laser beam into at least one of the sub-cavities to activate: a precursor material in at least one of the sub-cavities to increase the amount of the interrogation molecules; or a getter material in at least one of the sub-cavities to decrease the amount of the interrogation molecules.

15. The method of claim 14, wherein adjusting the amount of the interrogation molecules includes using a feedback loop to lock onto an absorption dip in the mmW energy received from the spectroscopy cavity.

16. The method of claim 14, wherein adjusting the amount of the interrogation molecules includes energizing a heater element adjacent the precursor material or adjacent the getter material.

17. The device of claim 9, wherein the trimming material is a precursor material for the gaseous interrogation molecules.

18. The device of claim 9, wherein the trimming material is a getter material for the gaseous interrogation molecules.

* * * * *